United States Patent
Nakao et al.

(10) Patent No.: US 10,149,546 B2
(45) Date of Patent: Dec. 11, 2018

(54) CUSHION PAD OF VEHICLE SEAT AND MANUFACTURING METHOD THEREOF

(71) Applicant: TOYOTA BOSHOKU KABUSHIKI KAISHA, Aichi-ken (JP)

(72) Inventors: Tomohiro Nakao, Aichi-ken (JP); Takeshi Shimosato, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/647,667

(22) Filed: Jul. 12, 2017

(65) Prior Publication Data

US 2018/0014650 A1 Jan. 18, 2018

(30) Foreign Application Priority Data

Jul. 13, 2016 (JP) ................... 2016-138240

(51) Int. Cl.
| | | |
|---|---|---|
| A47C 7/18 | (2006.01) |
| B29C 44/12 | (2006.01) |
| B60N 2/58 | (2006.01) |
| B60N 2/70 | (2006.01) |
| B29L 31/58 | (2006.01) |
| B29K 25/00 | (2006.01) |
| B29K 75/00 | (2006.01) |
| B29C 44/04 | (2006.01) |

(52) U.S. Cl.
CPC .......... *A47C 7/185* (2013.01); *B29C 44/1257* (2013.01); *B29C 44/1285* (2013.01); *B60N 2/5825* (2013.01); *B60N 2/5891* (2013.01); *B60N 2/70* (2013.01); *B29C 44/04* (2013.01); *B29K 2025/06* (2013.01); *B29K 2075/00* (2013.01); *B29L 2031/58* (2013.01)

(58) Field of Classification Search
CPC .. A47C 7/185; B29C 44/1257; B60N 2/5825; B60N 2/5891; B60N 2/70
USPC ....................................................... 297/452.6
See application file for complete search history.

(56) References Cited

U.S. PATENT DOCUMENTS

| | | | |
|---|---|---|---|
| 5,405,190 A * | 4/1995 | Jeffcoat | B60N 2/80 297/391 |
| 5,762,842 A | 6/1998 | Burchi et al. | |
| 5,827,546 A | 10/1998 | Burchi et al. | |
| 5,827,547 A | 10/1998 | Burchi et al. | |
| 5,882,073 A | 3/1999 | Burchi et al. | |
| 8,360,530 B2 * | 1/2013 | Onoda | B60N 2/646 297/452.21 |
| 8,662,560 B2 * | 3/2014 | Galbreath | B60N 2/5816 296/63 |

FOREIGN PATENT DOCUMENTS

| | | |
|---|---|---|
| JP | 2000-517210 | 12/2000 |
| WO | WO98/08704 | * 3/1998 |

* cited by examiner

*Primary Examiner* — Mark R Wendell
(74) *Attorney, Agent, or Firm* — Greenblum & Bernstein, P.L.C.

(57) ABSTRACT

A cushion pad of a vehicle seat including: a cushion member including a soft pad and a hard pad which is harder than the soft pad, the soft pad being integrated with the hard pad so as to wrap the hard pad without covering a mounting side surface of the hard pad, wherein a groove, which is opened to the mounting side and having a size large enough to receive an exuding piece generated during molding of the soft pad, is provided in a periphery of the mounting side surface of the hard pad.

9 Claims, 6 Drawing Sheets ered to as

CUSHION PAD OF VEHICLE SEAT AND MANUFACTURING METHOD THEREOF

CROSS-REFERENCE TO RELATED APPLICATIONS

This application claims priority from Japanese Patent Application No. 2016-138240 filed on Jul. 13, 2016, the entire contents of which are incorporated herein by reference.

TECHNICAL FIELD

The disclosure relates to a cushion pad of a passenger seating seat mounted on a vehicle such as an automobile, an airplane, a ship and a train, and a manufacturing method thereof.

BACKGROUND

There is a vehicle seat in which a lightweight hard pad is combined into a back side of a soft pad as a cushion member in order to reduce weight. The cushion pad of such vehicle seat is manufactured by setting a preformed hard pad in a molding die for foam-molding a soft pad, injecting a foaming agent forming the soft pad into a space between the hard pad and the molding die, and performing foam-molding (see JP-A-2000-517210).

In the case of manufacturing the cushion pad in this manner, there is a problem that the exudation of the soft pad occurs at a periphery of the hard pad in contact with the molding die. This problem will be described with reference to an example shown in FIG. 9. When a hard pad B is set in a molding die A and a soft pad C is foam-molded, the exudation of the soft pad C occurs, as indicated by D, in a periphery Ba of the hard pad B in contact with the molding die A. An exuding piece D thus generated is attached to a back side of the hard pad B.

When the cushion pad to which the exuding piece D is attached as described above is mounted on a vehicle, the exuding piece D comes into contact with a mounting surface of the vehicle side, and thus, there occurs a problem that the mounting accuracy of the cushion pad is decreased by the extent that the exuding piece D overlaps the hard pad B. In addition, there also occurs a problem that the exuding piece D rubs against the mounting surface of the vehicle side when a vehicle vibrates, thereby causing abnormal noise.

SUMMARY

Aspects of the disclosure provide a cushion pad which is formed by foam-molding a soft pad in a state where a hard pad is set in a molding die and in which the exudation by the foam-molding is performed at a place not appearing on the mounting surface. In this way, the reduction in mounting accuracy of the cushion pad and the occurrence of abnormal noise are suppressed.

According to an aspect of the disclosure, there is provided a cushion pad of a vehicle seat including: a cushion member including a soft pad and a hard pad which is harder than the soft pad, the soft pad being integrated with the hard pad so as to wrap the hard pad without covering a mounting side surface of the hard pad, wherein a groove, which is opened to the mounting side and having a size large enough to receive an exuding piece generated during molding of the soft pad, is provided in a periphery of the mounting side surface of the hard pad.

According to another aspect of the disclosure, there is provided a method of manufacturing a cushion pad of a vehicle seat, which includes a cushion member including a soft pad and a hard pad which is harder than the soft pad, the method including: foam-molding the soft pad in a molding die in a state where the preformed hard pad is set in the molding die, wherein the molding die includes a protruding portion protruding to the inside of the molding die at an outer side of a periphery of the hard pad, and wherein an exuding piece of the soft pad, which is exuded to the periphery of the hard pad during the foam-molding of the soft pad, is formed at a boundary portion between the protruding portion and the hard pad.

According to another aspect of the disclosure, there is provided a method of manufacturing a cushion pad of a vehicle seat, which includes a cushion member including a soft pad and a hard pad which is harder than the soft pad, the method including: foam-molding the soft pad in a molding die in a state where the preformed hard pad is set in the molding die, wherein a notch is formed to a periphery of the hard pad so as to form a stepped portion, wherein the molding die includes a protruding portion protruding to the inside of the molding die and fitting into the notch, and wherein an exuding piece of the soft pad, which is exuded to the periphery of the hard pad during the foam-molding of the soft pad, is formed at a boundary portion between the protruding portion and the hard pad.

DETAILED DESCRIPTION OF DRAWINGS

Figure 1:
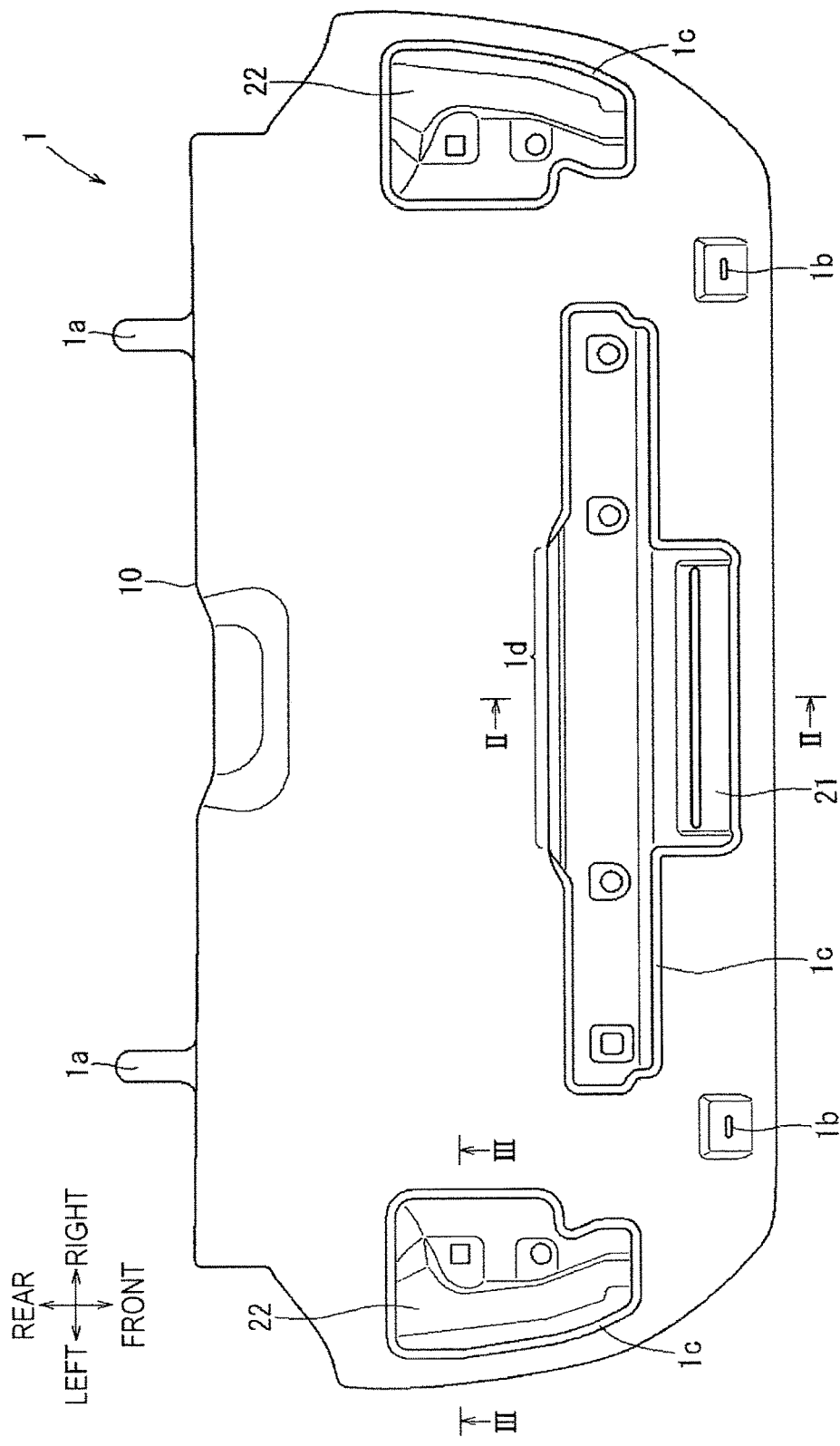
FIG. 1 is a rear view of a cushion pad according to one embodiment of the disclosure.
Figure 2:
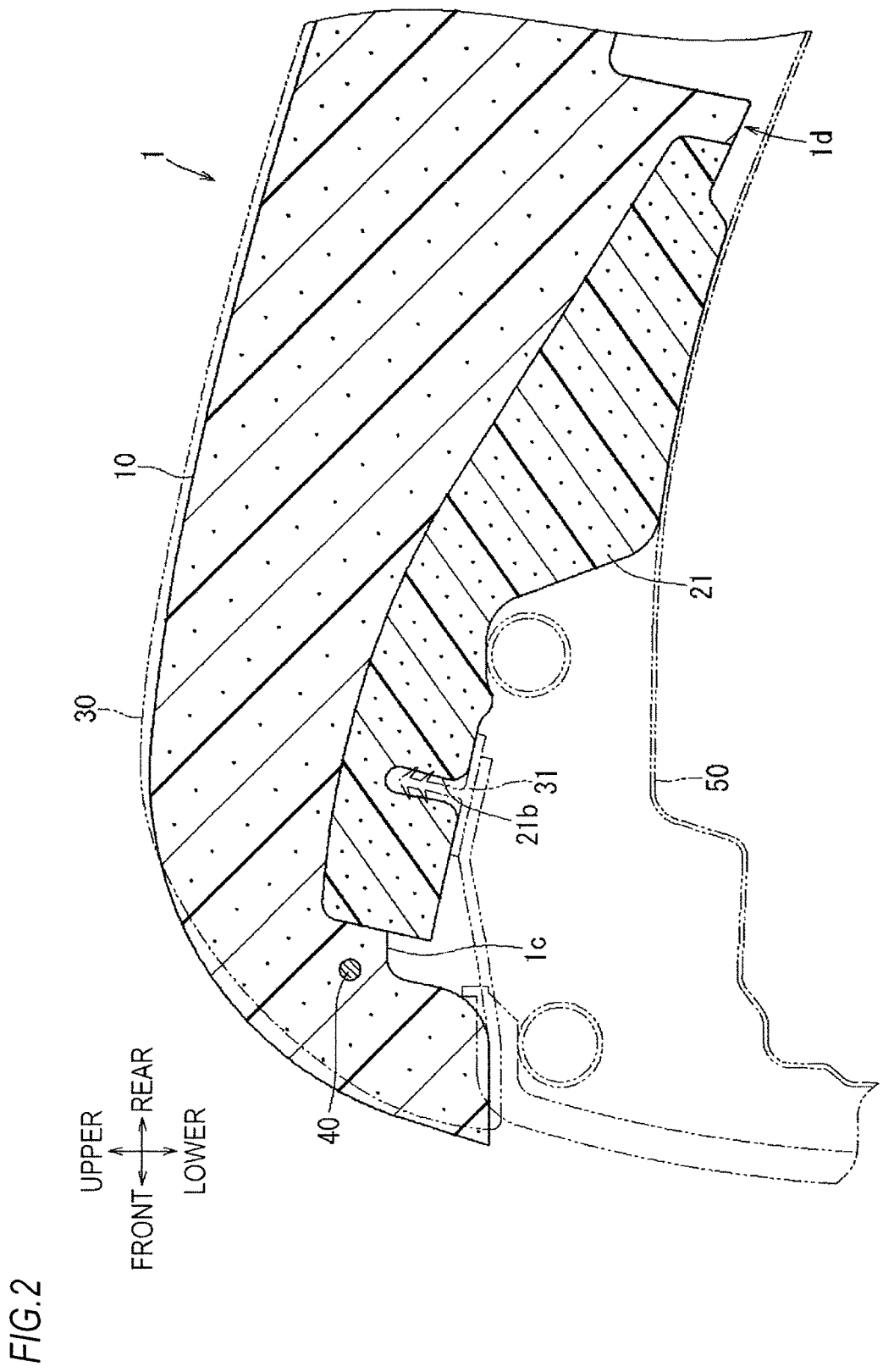
FIG. 2 is an enlarged sectional view taken along the line II-II in FIG. 1.
Figure 3:
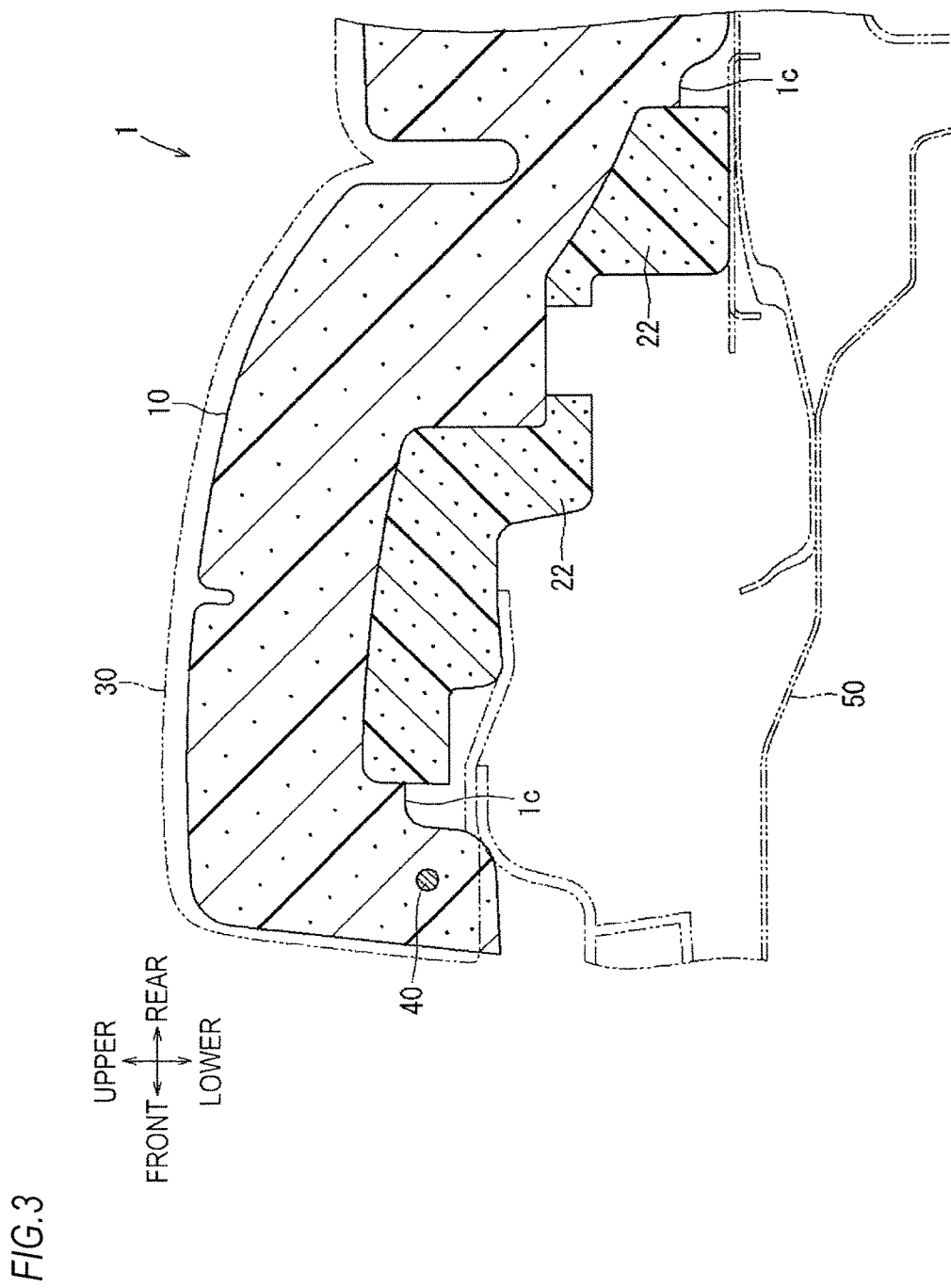
FIG. 3 is an enlarged sectional view taken along the line III-III in FIG. 1.

FIGS. 1 to 3 show one embodiment of the disclosure. This embodiment is an example in which the disclosure is applied to an automobile rear seat (hereinafter, simply referred to as a "seat"). As is well known, the seat includes a seat cushion serving as a seating part and a seat back serving as a backrest. In this embodiment, the disclosure is applied to a cushion pad 1 of the seat cushion. In each drawing, respective directions in the state where a seat is mounted to an automobile are indicated by arrows. In the following, the descriptions relating to the directions will be made on the basis of these directions.

As shown in FIG. 1, the cushion pad 1 is formed by combining, as a cushion member, a urethane pad (the cushion member of the disclosure corresponding to the soft pad) 10 and three hard foams (the cushion member of the disclosure corresponding to the hard pad) 21, 22 having hardness different from each other. The urethane pad 10 is formed by foaming polyurethane so as to form an outer shape of the cushion pad 1. Further, the hard foams 21, 22 are, for example, composite resin foams of polystyrene and polyolefin and are formed separately from the urethane pad 10. For the hard foams 21, 22, a material formed by injection molding or the like other than foaming may be used. The hard foams 21, 22 are fixed to a lower surface side of the urethane pad 10 and integrated with the urethane pad 10, so that the hard foams 21, 22 and the urethane pad 10 constitute the cushion pad 1.

The urethane pad 10 has hardness capable of giving a suitable cushion feeling to a passenger seated on a seat. The hard foams 21, 22 are harder than the urethane pad 10 in hardness against the pressing deformation. That is, the hard foams 21, 22 are set to hardness for suppressing the cushion pad 1 from being excessively submerged in a state where the cushion pad 1 is fixed on a vehicle body and a passenger is seated thereon. Moreover, the hard foams 21, 22 have weights per unit volume lighter than those of the urethane pad 10, thereby reducing the weight of the cushion pad 1.

As shown in FIG. 1, the hard foams 21, 22 are divided into three parts and disposed at the lower portions on the front side and both left and right sides of the cushion pad 1. In this way, the thigh of the passenger seated on the cushion pad 1 and the left side and right side of the buttock of the passenger seated on the left side end and right side end of the cushion pad 1 are supported so as not to be submerged.

Figure 4:
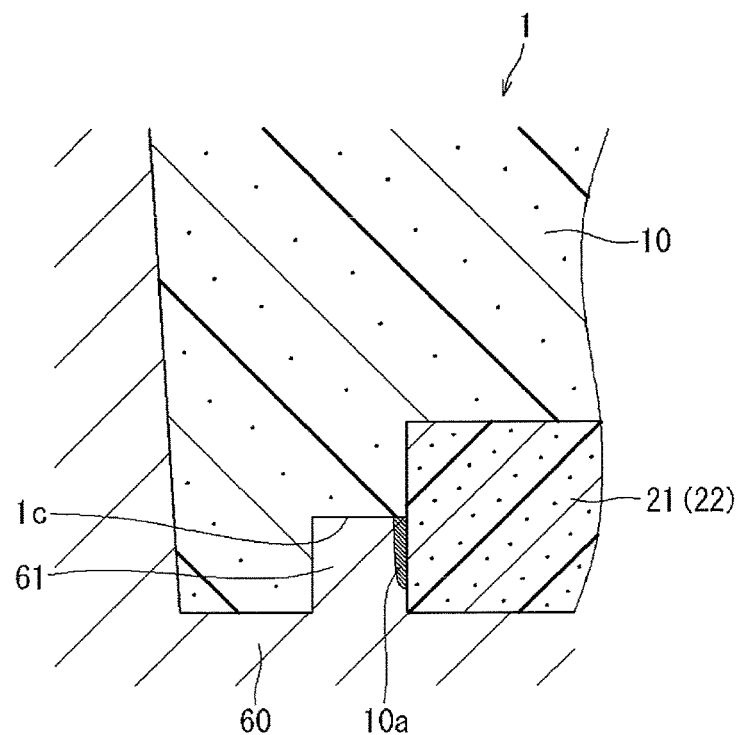
FIG. 4 is a schematic view for explaining a first embodiment of a manufacturing method of the cushion pad.

FIG. 4 is a schematic view showing a first embodiment of a manufacturing method of the cushion pad 1. As in the prior art, the cushion pad 1 is formed by foam-molding the urethane pad 10 in a mold 60 (corresponding to the molding die of the disclosure) in a state where the hard foam 21 (22) is set in the mold 60. In the present embodiment, on the outer side of a periphery of the hard foam 21 (22) in contact with the mold 60, a protruding portion 61 is formed to protrude from the mold 60 to the inside of the mold 60.

Figure 9:
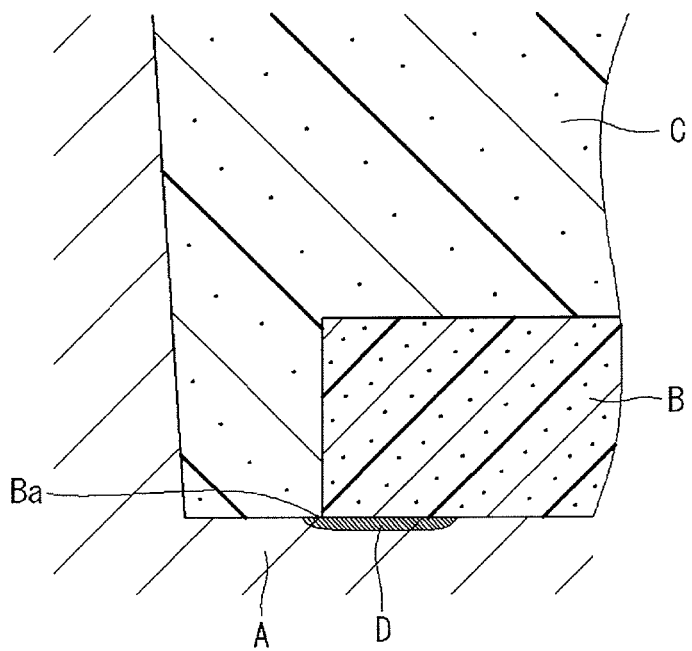
FIG. 9 is a schematic view for explaining a manufacturing method of a conventional cushion pad.

As described with reference to FIG. 9, when the foam-molding of the urethane pad 10 is performed, the exuding piece D of the soft pad C is formed at a gap between the hard pad B and the molding die A. As shown in FIG. 4, by using the mold 60 having the protruding portion 61, an exuding piece 10a generated when the foam-molding of the urethane pad 10 is performed is formed at a boundary portion between the protruding portion 61 and the hard foam 21 (22).

When the molding of the urethane pad 10 is completed, and then, the detachment of the mold 60 is performed, a groove 1c having an open lower surface (mounting side surface) is formed in the portion from which the protruding portion 61 is removed. Therefore, the exuding piece 10a is received in the groove 1c. In this case, the groove 1c has a size of 10 mm square and extends over the entire periphery of the hard foam 21 (22). Therefore, the exuding piece 10a formed over the entire periphery of the hard foam 21 (22) can be received in the groove 1c. Meanwhile, the above-described size of the groove 1c is an example, and the groove 1c can be set to an appropriate size necessary for receiving the exuding piece 10a.

According to the manufacturing method of the cushion pad 1 described with reference to FIG. 4, the protruding portion 61 can function as a guide when setting the hard foams 21, 22 in the molding die. Therefore, it is possible to facilitate the setting operation of the hard foams 21, 22. Furthermore, since the protruding portion 61 covers the periphery of the hard foams 21, 22 during the foam-molding of the urethane pad 10, it is possible to suppress the influence of the heat generated during the foam-molding of the urethane pad 10 on the hard foams 21, 22.

In the embodiment of FIGS. 1 to 3, the groove 1c is formed on the entire periphery of the periphery of the hard foam 22, as shown in FIG. 3. On the other hand, the groove 1c is formed on the portion of a periphery of the hard foam 21 excluding a portion 1d, as shown in FIG. 2. Out of the urethane pad 10 foam-molded in the mold 60, the portion 1d of the periphery of the hard foam 21 has a narrow width, and thus, it is difficult to form the groove 1c in the portion 1d.

The cushion pad 1 is covered with a seat cover 30 and fixed to a vehicle body. As shown in FIGS. 2 and 3, the seat cover 30 covered on the cushion pad 1 wraps around the periphery of the cushion pad 1 and is fixed to a lower surface of the cushion pad 1 at the lower side of the periphery of the cushion pad 1. Such fixation is performed by inserting fasteners 31 fixed to an end portion of the seat cover 30 into fixing grooves 21b of the hard foams 21, 22 (see FIG. 2).

The cushion pad 1 covered with the seat cover 30 in this manner is fixed on a vehicle body floor 50. At this time, there is a possibility that the exuding piece 10a formed on the periphery of the hard foams 21, 22 is fitted between the cushion pad 1 and the vehicle body floor 50. However, in the case of the present embodiment, the exuding piece 10a is received in the groove 1c of the cushion pad 1. Therefore, the exuding piece 10a is not fitted between the cushion pad 1 and the vehicle body floor 50 even when it is located near the vehicle body floor 50. In this way, it is possible to prevent the mounting accuracy of the cushion pad 1 on the vehicle body floor 50 from being decreased due to the fact that the exuding piece 10a is fitted between the cushion pad 1 and the vehicle body floor 50. Moreover, it is possible to suppress the occurrence of abnormal noise due to the rubbing of the exuding piece 10a against the vehicle body floor 50 when the vehicle body vibrates.

Among the lower surface of the cushion pad 1, in the region covered with the seat cover 30, the seat cover 30 is interposed between the cushion pad 1 and the vehicle body floor 50. Therefore, even when the exuding piece 10a is formed at the periphery of the hard foams 21, 22, the exuding piece 10a is prevented from rubbing against the vehicle body floor 50. In this way, the occurrence of abnormal noise is also suppressed.

In the cushion pad 1 of the above embodiment, the groove 1c is formed in the urethane pad 10. Therefore, the size of the urethane pad 10 can be reduced, thereby reducing the weight of the cushion pad 1. Further, the hard foams 21, 22 are not integrated but divided into three parts. Therefore, it is possible to suppress the warping of the hard foams 21, 22 after the urethane pad 10 is integrally molded.

As shown in FIGS. 2 and 3, a wire 40 is embedded in the urethane pad 10. That is, when molding the urethane pad 10 in the foam-molding die, the foam-molding is performed in a state where the wire 40 made of a wire material is inserted in a mold in advance. The wire 40 is formed along an outer shape of the cushion pad 1 as a framework for securing the rigidity of the urethane pad 10 as a seat cushion and forms a frame member of the urethane pad 10.

As shown in FIG. 1, mounting protrusions 1a are provided to protrude obliquely upward on both left and right sides of the rear end of the urethane pad 10. Further, mounting protrusions 1b are provided to protrude obliquely downward on both left and right sides of the lower portion of the front end of the urethane pad 10. The mounting protrusions 1a are configured by embedding the wires 40 in the urethane pad 10. On the other hand, the mounting protrusions 1b are configured by protruding the wires 40 from the urethane pad 10. In each of the mounting protrusions 1b, the wire 40 is formed such that it is bent into a U shape so as to protrude downward. The mounting protrusions 1a and the mounting protrusions 1b are used as fixing means when the seat cover 30 is covered on the urethane pad 10 to form the seat cushion and is fixed to the vehicle body.

Figure 5:
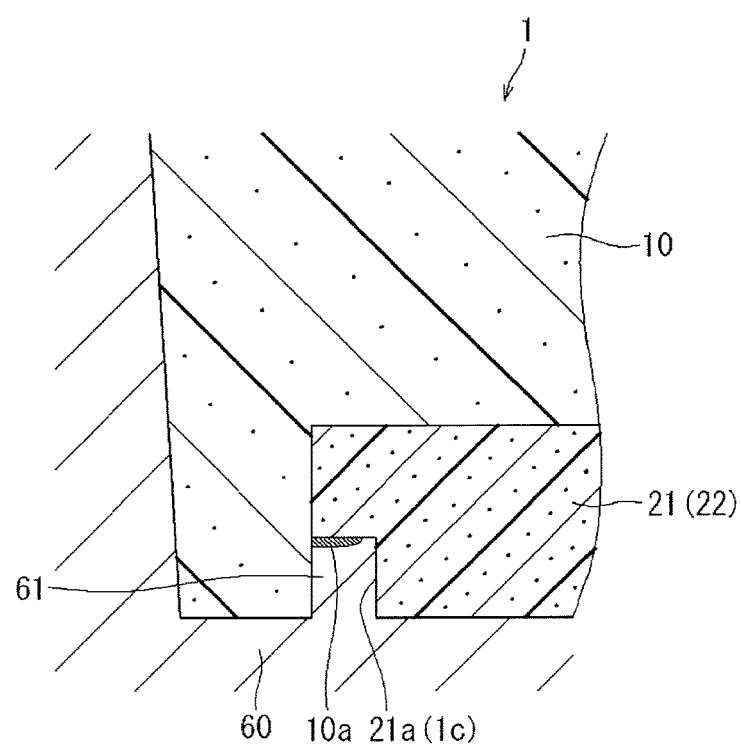
FIG. 5 is a schematic view similar to FIG. 4, showing a second embodiment of the manufacturing method.

FIG. 5 shows a second embodiment of the manufacturing method of the cushion pad 1. The feature of the second embodiment different from the first embodiment in FIG. 4 is that the protruding portion 61 of the mold 60 is provided so as to correspond to the periphery of the hard foam 21 (22). Other configurations of the second embodiment are the same as in the first embodiment, and the description for the same parts will be omitted.

As shown in FIG. 5, at the portion of the periphery of the hard foam 21 (22) corresponding to the protruding portion 61, a notch 21a is formed to form a stepped portion. When foam-molding the urethane pad 10, the protruding portion 61 is fitted into the notch 21a. The exuding piece 10a of the urethane pad 10 is formed at the boundary portion between the protruding portion 61 and the hard foam 21 (22). When the detachment of the mold 60 is performed, the portion from which the protruding portion 61 is removed becomes the groove 1c and the exuding piece 10a is received in the groove 1c.

In the case of the second embodiment, the foam-molding of the urethane pad 10 is performed in the state where the protruding portion 61 is fitted into the notch 21a of the hard foam 21 (22). Therefore, it is possible to suppress the possibility that the protruding portion 61 hinders the flow of the foam during the foam-molding. In this way, it is possible to improve the moldability of the urethane pad 10.

Figure 6:
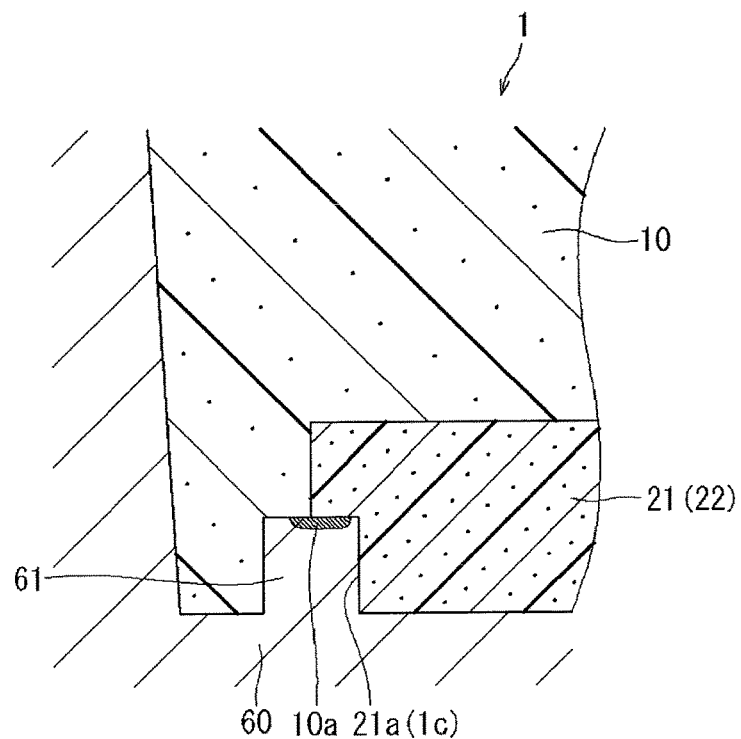
FIG. 6 is a schematic view similar to FIG. 4, showing a third embodiment of the manufacturing method.

FIG. 6 shows a third embodiment of the manufacturing method of the cushion pad 1. The feature of the third embodiment different from the first embodiment in FIG. 4 is that the protruding portion 61 of the mold 60 is provided at the periphery of the hard foam 21 (22) so as to correspond to the position which extends over the periphery and the foamed area of the urethane pad 10. Other configurations of the third embodiment are the same as in the first embodiment, and the description for the same parts will be omitted.

As shown in FIG. 6, at the portion of the periphery of the hard foam 21 (22) corresponding to the protruding portion 61, the notch 21a is formed to form a stepped portion. This notch 21a has a cutting depth in a horizontal direction shallower than the notch 21a in FIG. 5. Therefore, although the protruding portion 61 is in a state of being fitted into the notch 21a when the urethane pad 10 is foam-molded, the protruding portion 61 is exuded from the notch 21a. The exuding piece 10a of the urethane pad 10 is formed at the boundary portion between the protruding portion 61 and the hard foam 21 (22). When the detachment of the mold 60 is performed, the portion from which the protruding portion 61 is removed becomes the groove 1c and the exuding piece 10a is received in the groove 1c. At this time, the groove 1c is formed over the periphery of the hard foam 21 (22) and the urethane pad 10 adjacent thereto.

In the case of the third embodiment, the position of the groove 1c is located at an intermediate position of the first embodiment and the second embodiment. Therefore, the operational effect of the third embodiment corresponds to the intermediate operational effect of both embodiments.

Figure 7:
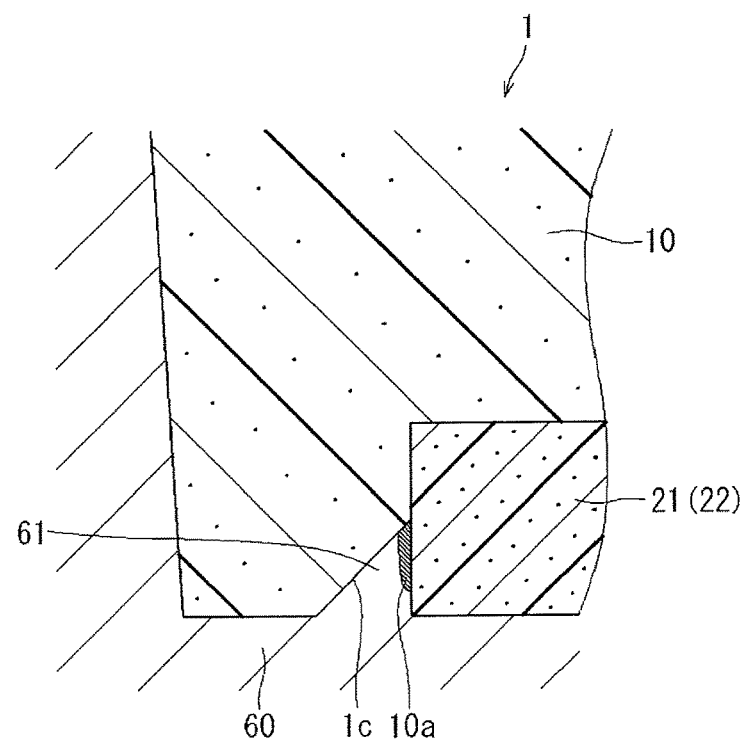
FIG. 7 is a schematic view similar to FIG. 4, showing a fourth embodiment of the manufacturing method.
Figure 8:
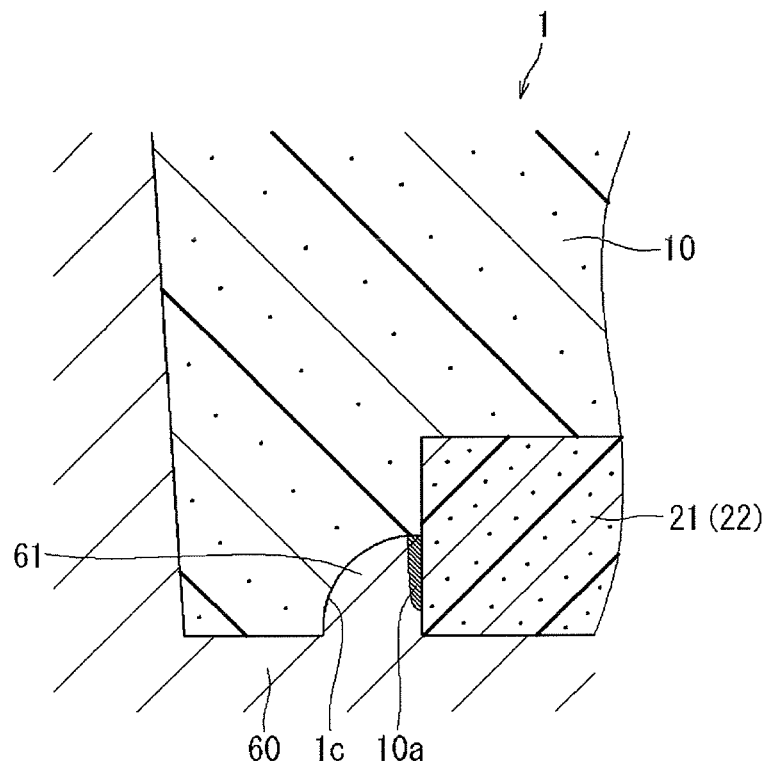
FIG. 8 is a schematic view similar to FIG. 4, showing a fifth embodiment of the manufacturing method.

FIGS. 7 and 8 show fourth and fifth embodiments of the manufacturing method of the cushion pad 1. The features of the fourth and fifth embodiments different from the first embodiment in FIG. 4 are that the sectional shapes of the protruding portions 61 of the molds 60 are changed. Other configurations of the fourth and fifth embodiments are the same as in the first embodiment, and the description for the same parts will be omitted.

In the fourth embodiment of FIG. 7, the sectional shape of the protruding portion 61 has a saw-toothed shape. Further, in the fifth embodiment of FIG. 8, the sectional shape of the protruding portion 61 has a shape in which corners of the rectangular shape in FIG. 4 are rounded.

In the case of the fourth and fifth embodiments, only the sectional shape of the protruding portion 61 is different from the first embodiment, and basically, there is no functional difference in comparison with the first embodiment. Of course, the protruding portion 61 may have various sectional shapes other than these sectional shapes.

Although specific embodiments have been described above, the disclosure is not limited to these appearances and configurations, and various modifications, additions and deletions can be made without changing the gist of the disclosure. For example, although, in the above embodiment, the disclosure is applied to an automobile rear seat, the disclosure may be applied to an automobile front seat. Further, although, in the above embodiment, the disclosure is applied to a cushion pad of a seat cushion, the disclosure may be applied to a back pad of a seat back. Furthermore, although, in the above embodiment, the disclosure is applied to an automobile seat, the disclosure may be applied to a seat to be mounted on a vehicle such as an airplane, a ship or a train.

The disclosure provides illustrative, non-limiting examples as follows:

According to a first aspect, there is provided a cushion pad of a vehicle seat including: a cushion member including a soft pad and a hard pad which is harder than the soft pad, the soft pad being integrated with the hard pad so as to wrap the hard pad without covering a mounting side surface of the hard pad, wherein a groove, which is opened to the mounting side and having a size large enough to receive an exuding piece generated during molding of the soft pad, is provided in a periphery of the mounting side surface of the hard pad.

According to the first aspect, the exuding piece is received in the groove. Therefore, the exuding piece does not come into contact with the mounting surface when the cushion pad is mounted on the vehicle, and thus, the reduction in the mounting accuracy of the cushion pad can be suppressed and the occurrence of abnormal noise caused by the vibration of the cushion pad can be suppressed.

According to a second aspect, there is provided the cushion pad of the vehicle seat according to the first aspect, wherein the groove is provided to a portion of the soft pad which is adjacent to the hard pad.

According to the second aspect, the soft pad can be downsized by an amount corresponding to the formation of the groove, so that the weight of the cushion pad can be reduced.

According to a third aspect, there is provided the cushion pad of the vehicle seat according to the first aspect, wherein the groove is provided to a portion of the hard pad which is adjacent to the soft pad.

According to the third aspect, the hard pad can be downsized by an amount corresponding to the formation of the groove, so that the weight of the cushion pad can be reduced.

According to a fourth aspect, there is provided the cushion pad of the vehicle seat according to any one of the first to third aspects, wherein the hard pad includes a plurality of parts which are integrated with the soft pad.

When the hard pad is large, partial shrinkage occurs after integral molding with the soft pad, and hence, warping may occur in the hard pad. According to the fourth aspect, the hard pad is divided into a plurality of parts, and hence, its size is reduced. Therefore, it is possible to suppress the occurrence of warping.

According to a fifth aspect, there is provided the cushion pad of the vehicle seat according to any one of the first to fourth aspects, wherein the groove is continuously provided so as to surround a region of the hard pad which is not covered by the soft pad.

According to the fifth aspect, the groove is formed on the entire periphery of the hard pad, and thus, the exuding piece can be received in the groove over the entire hard pad. Therefore, the reduction in mounting accuracy of the cushion pad and the occurrence of abnormal noise caused by the vibration of the cushion pad can be effectively suppressed.

According to a sixth aspect, there is provided the cushion pad of the vehicle seat according to any one of the first to fourth aspects, further including a seat cover covering a surface of the cushion pad, wherein the groove is provided in a region which is not covered by the seat cover and in a periphery of a region of the hard pad which is not covered by the soft pad.

According to the sixth aspect, in the region not covered by the seat cover, the exuding piece is received in the groove. On the other hand, in the region covered by the seat cover, the exuding piece is also covered with the seat cover. Therefore, it is possible to suppress the occurrence of abnormal noise over the entire cushion pad.

According to a seventh aspect, there is provided a method of manufacturing a cushion pad of a vehicle seat, which includes a cushion member including a soft pad and a hard pad which is harder than the soft pad, the method including: foam-molding the soft pad in a molding die in a state where the preformed hard pad is set in the molding die, wherein the molding die includes a protruding portion protruding to the inside of the molding die at an outer side of a periphery of the hard pad, and wherein an exuding piece of the soft pad, which is exuded to the periphery of the hard pad during the foam-molding of the soft pad, is formed at a boundary portion between the protruding portion and the hard pad.

According to the seventh aspect, when the cushion pad is detached from the molding die, the exuding piece formed at the boundary portion between the protruding portion and the hard pad is in a state of being received in the groove formed by the protruding portion. Therefore, the same operational effects as the first aspect can be achieved. Further, the protruding portion can function as a guide when setting the hard pad in the molding die. Therefore, it is possible to facilitate the setting operation of the hard pad. Furthermore, since the protruding portion covers the periphery of the hard pad during the foam-molding of the soft pad, it is possible to suppress the influence of the heat generated during the foam-molding of the soft pad on the hard pad.

According to an eighth aspect, there is provided a method of manufacturing a cushion pad of a vehicle seat, which includes a cushion member including a soft pad and a hard pad which is harder than the soft pad, the method including: foam-molding the soft pad in a molding die in a state where the preformed hard pad is set in the molding die, wherein a notch is formed to a periphery of the hard pad so as to form a stepped portion, wherein the molding die includes a protruding portion protruding to the inside of the molding die and fitting into the notch, and wherein an exuding piece of the soft pad, which is exuded to the periphery of the hard pad during the foam-molding of the soft pad, is formed at a boundary portion between the protruding portion and the hard pad.

According to the eighth aspect, the foam-molding of the soft pad is performed in a state where the protruding portion is fitted into the notch of the hard pad. Therefore, it is possible to suppress the possibility that the protruding portion hinders the flow of the foam during the foam-molding. In this way, it is possible to improve the moldability of the soft pad.

What is claimed is:

1. A cushion pad of a vehicle seat comprising:
    a cushion member including a soft pad and a hard pad which is harder than the soft pad, the soft pad being integrated with the hard pad so as to wrap the hard pad without covering a mounting side surface of the hard pad,
    wherein a groove, which is opened to the mounting side surface and having a size large enough to receive an exuding piece generated during molding of the soft pad, is provided in a periphery of the mounting side surface of the hard pad, and
    wherein the periphery is a boundary between the hard pad and the soft pad.

2. The cushion pad of the vehicle seat according to claim 1,
    wherein the groove is provided to a portion of the soft pad which is adjacent to the hard pad.

3. The cushion pad of the vehicle seat according to claim 1,
    wherein the groove is provided to a portion of the hard pad which is adjacent to the soft pad.

4. The cushion pad of the vehicle seat according to claim 1,
    wherein the hard pad includes a plurality of parts which are integrated with the soft pad.

5. The cushion pad of the vehicle seat according to claim 1,
    wherein the groove is continuously provided so as to surround a region of the hard pad which is not covered by the soft pad.

6. The cushion pad of the vehicle seat according to claim 1, further comprising a seat cover covering a surface of the cushion pad,
    wherein the groove is provided in a region which is not covered by the seat cover and in a periphery of a region of the hard pad which is not covered by the soft pad.

7. A method of manufacturing a cushion pad of a vehicle seat, which includes a cushion member including a soft pad and a preformed hard pad which is harder than the soft pad, the method comprising:
    foam-molding the soft pad in a molding die in a state where the preformed hard pad is set in the molding die,
    wherein the molding die includes a protruding portion protruding to the inside of the molding die at an outer side of a periphery of the preformed hard pad, and
    wherein an exuding piece of the soft pad, which is exuded to the periphery of the preformed hard pad during the foam-molding of the soft pad, is formed at a boundary portion between the protruding portion and the preformed hard pad.

8. A method of manufacturing a cushion pad of a vehicle seat, which includes a cushion member including a soft pad and a preformed hard pad which is harder than the soft pad, the method comprising:
    foam-molding the soft pad in a molding die in a state where the preformed hard pad is set in the molding die, wherein a notch is formed to a periphery of the preformed hard pad so as to form a stepped portion, wherein the molding die includes a protruding portion protruding to the inside of the molding die and fitting into the notch, and wherein an exuding piece of the soft pad, which is exuded to the periphery of the preformed hard pad during the foam-molding of the soft pad, is formed at a boundary portion between the protruding portion and the preformed hard pad.

9. A cushion pad of a vehicle seat comprising:

a cushion member including a soft pad and a hard pad which is harder than the soft pad, the soft pad being integrated with the hard pad so as to wrap the hard pad without covering a mounting side surface of the hard pad, wherein a groove, which is opened to the mounting side surface and having a size large enough to receive an exuding piece generated during molding of the soft pad, is provided in a periphery of the mounting side surface of the hard pad, and wherein the hard pad is divided at a position near a buttock of a seated passenger.

* * * * *